(12) United States Patent
Chen et al.

(10) Patent No.: US 11,881,337 B2
(45) Date of Patent: Jan. 23, 2024

(54) PPTC COMPOSITION AND DEVICE HAVING LOW THERMAL DERATING AND LOW PROCESS JUMP

(71) Applicant: Littelfuse Electronics (Shanghai) Co., Ltd., Shanghai (CN)

(72) Inventors: Jianhua Chen, Sunnyvale, CA (US); Chun-Kwan Tsang, Newark, CA (US); Zhiyong Zhou, Shanghai (CN); Yingsong Fu, Shanghai (CN); Edward W. Rutter, Jr., Pleasanton, CA (US)

(73) Assignee: Littelfuse Electronics (Shanghai) Co., Ltd., Shanghai (CN)

( * ) Notice: Subject to any disclaimer, the term of this patent is extended or adjusted under 35 U.S.C. 154(b) by 407 days.

(21) Appl. No.: 17/295,943

(22) PCT Filed: Nov. 23, 2018

(86) PCT No.: PCT/CN2018/117250
§ 371 (c)(1),
(2) Date: May 21, 2021

(87) PCT Pub. No.: WO2020/103142
PCT Pub. Date: May 28, 2020

(65) Prior Publication Data
US 2022/0013259 A1 Jan. 13, 2022

(51) Int. Cl.
*H01C 7/02* (2006.01)
*C08J 5/18* (2006.01)
(Continued)

(52) U.S. Cl.
CPC ............. *H01C 7/027* (2013.01); *C08J 5/18* (2013.01); *C08K 3/14* (2013.01); *C08L 23/06* (2013.01);
(Continued)

(58) Field of Classification Search
CPC ...................................... H01C 7/027
See application file for complete search history.

(56) References Cited

U.S. PATENT DOCUMENTS 5,451,919 A 9/1995 Chu et al.
5,554,679 A 9/1996 Cheng
(Continued)

FOREIGN PATENT DOCUMENTS

CN 1231635 A 10/1999
CN 1244716 A 2/2000
(Continued)

OTHER PUBLICATIONS

International Search Report and Written Opinion dated Aug. 22, 2019 for PCT/CN2018/117250.
(Continued)

*Primary Examiner* — William D Young
(74) *Attorney, Agent, or Firm* — KDW Firm PLLC

(57) ABSTRACT

A novel polymer positive temperature coefficient (PPTC) material, device, and method of fabrication. One example of polymer positive temperature coefficient (PPTC) includes a polymer matrix, the polymer matrix comprising a first polymer. The PPTC material may further include a conductive filler, disposed in the polymer matrix; and at least one polymer filler, dispersed within the polymer matrix. The at least one polymer filler may comprise a second polymer, different from the first polymer, wherein the at least one polymer comprises a first melting temperature, and wherein the second polymer comprises a second melting temperature, the second melting temperature exceeding the first melting temperature by at least 20 C.

19 Claims, 6 Drawing Sheets

(51) Int. Cl.
    *C08K 3/14*         (2006.01)
    *C08L 23/06*      (2006.01)
    *C08L 63/00*      (2006.01)
    *C08L 27/16*      (2006.01)
    *C08L 77/02*      (2006.01)

(52) U.S. Cl.
    CPC .............. *C08L 63/00* (2013.01); *H01C 7/021* (2013.01); *C08K 2201/001* (2013.01); *C08L 27/16* (2013.01); *C08L 77/02* (2013.01); *C08L 2205/035* (2013.01); *C08L 2207/066* (2013.01)

(56) References Cited

U.S. PATENT DOCUMENTS

| | | | |
|---|---|---|---|
| 9,997,906 B1* | 6/2018 | Yen | H01C 17/06586 |
| 10,056,176 B2 | 8/2018 | Wang | |
| 2007/0187655 A1 | 8/2007 | Wang | |
| 2009/0206980 A1 | 8/2009 | Yamashita | |
| 2011/0297891 A1* | 12/2011 | Mercx | H01C 17/06586 252/511 |

FOREIGN PATENT DOCUMENTS

| | | | |
|---|---|---|---|
| CN | 1378217 A | | 11/2002 |
| CN | 103762050 A | | 4/2014 |
| CN | 106317544 A | | 1/2017 |
| WO | WO 98/05503 | * | 2/1998 |
| WO | 2011051915 A1 | | 5/2011 |

OTHER PUBLICATIONS

Wikipedia, "Carbon black," https://en.wikipedia.org/w/index.php?title=Carbon_black&oldid1076403590 retrieved Apr. 25, 2022, last edited Mar. 10, 2022, 6 pages.

* cited by examiner

PPTC COMPOSITION AND DEVICE HAVING LOW THERMAL DERATING AND LOW PROCESS JUMP

BACKGROUND

Field

Embodiments relate to the field of circuit protection devices, including fuse devices.

Discussion of Related Art

Polymer positive temperature coefficient (PPTC) devices may be used as overcurrent or over-temperature protection device, as well as current or temperature sensors, among various applications. In overcurrent or over-temperature protection applications, the PPTC device may be considered a resettable fuse, designed to exhibit low resistance when operating under designed conditions, such as low current. The resistance of the PPTC device may be altered by direct heating due to temperature increase in the environment of the circuit protection element, or via resistive heating generated by electrical current passing through the circuit protection element. For example, a PPTC device may include a polymer material and a conductive filler that provides a mixture that transitions from a low resistance state to a high resistance state, due to changes in the polymer material, such as a melting transition or a glass transition. At such a transition temperature, sometimes called a trip temperature, where the trip temperature may often range from room temperature or above, the polymer matrix may expand and disrupt the electrically conductive network, rendering the composite much less electrically conductive. This change in resistance imparts a fuse-like character to the PPTC materials, which resistance may be reversible when the PPTC material cools back to room temperature.

For proper functioning, when operating in a low temperature state below the trip temperature, little of no change in resistance of the PPTC device may be useful. A property that is termed thermal derating characterizes the resistance behavior of a PPTC device in the low temperature state, where thermal derating measures the change in hold current or the change in resistance as a function of temperature in the low temperature state. While the tripping of PPTC device to a high resistance state is characterized by a melting or glass transition of the polymer matrix, in the low temperature state below the melt transition, the polymer matrix may also expand as a function of increasing temperature. This expansion is a characteristic of the thermal properties of the polymer matrix, and may cause an increase in electrical resistance as conductive filler particles become separated, leading to thermal derating. For an ideal PPTC device, a low thermal derating may be called for where little change in resistance or hold current takes place with increased temperature below the trip temperature. With respect to these and other considerations, the present disclosure is provided.

BRIEF SUMMARY

In one embodiment, a polymer positive temperature coefficient (PPTC) may include a polymer matrix, the polymer matrix comprising a first polymer. The PPTC material may further include a conductive filler, disposed in the polymer matrix; and at least one polymer filler, dispersed within the polymer matrix. The at least one polymer filler may comprise a second polymer, different from the first polymer, wherein the at least one polymer comprises a first melting temperature, and wherein the second polymer comprises a second melting temperature, the second melting temperature exceeding the first melting temperature by at least 20 C.

In another embodiment, a polymer positive temperature coefficient (PPTC) material may include a polymer matrix, the polymer matrix comprising a first polymer, a conductive filler, disposed in the polymer matrix, and at least one polymer filler, dispersed within the polymer matrix, the at least one polymer filler comprising a second polymer, different from the first polymer, wherein the first polymer comprises a first melting temperature, and wherein the second polymer comprises an amorphous material.

In an additional embodiment, a method of forming a PPTC assembly may include providing a polymer matrix, the polymer matrix comprising a first polymer. The method may include mixing a first powder, comprising a second polymer, and a second powder, comprising a conductive filler, in the polymer matrix, to form a PPTC material. The method may further include performing hot melt extrusion process on the PPTC material; extruding the PPTC material to form a PPTC film; performing a foil lamination process on the PPTC film to form a device sheet; and singulating the device sheet to form a PPTC device.

DESCRIPTION OF EMBODIMENTS

Figure 1A:
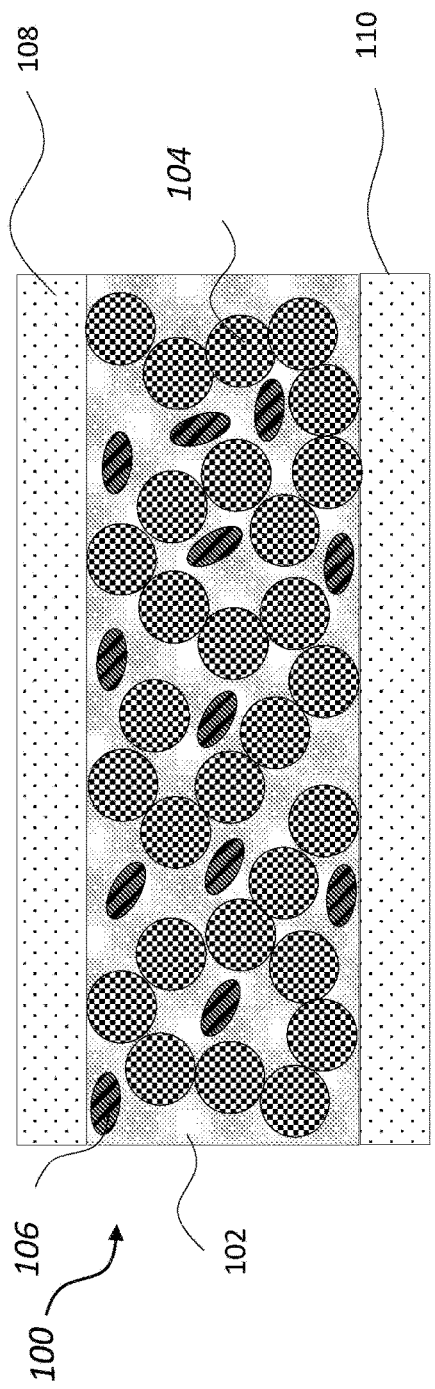
FIG. 1A depicts a side cross-sectional view of a PPTC device, according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, materials and device structures are provided for forming a PPTC assembly and PPTC device, where the PPTC device may be configured to operate as a resettable fuse, to operate with relatively low thermal derating in a low temperature state. In various embodiments, a high PPTC assembly includes a polymer matrix and conductive filler to form a PPTC material characterized by a trip temperature where electrical resistance increases sharply. In some embodiments, the PPTC assembly may further include at least one additional component, such as a low thermal expansion filler polymer material (LTE), or a high temperature polymer filler, as described below.

In various embodiments, a PPTC assembly may be constructed as shown in FIG. 1A. FIG. 1A illustrates a side cross-sectional view of a PPTC device 100, where a polymer matrix 102 includes a conductive filler 104, dispersed therein. The polymer matrix 102 may be formed of any suitable polymer for forming a PPTC device, as known in the art. In some embodiments, the polymer matrix may be formed from a polyolefin, such as polyethylene (PE), low density polyethylene (LDPE), high density polyethylene (HDPE), an ethylene tetrafluoroethylene copolymer (ETFE), polytetrafluoroethylene (PTFE), polychlorotrifluoroethylene, perfluoroalkoxy alkane, or tetrafluoroethylene-perfluoropropylene, polyvinylidene fluoride, other fluoropolymer or other fluorine-containing polymer. The embodiments are not limited in this context.

In various embodiments, the conductive filler 104 may be a metal filler, including nickel, copper; a carbon filler, such as carbon black or graphite, a conductive ceramic filler, such as tungsten carbide, or titanium carbide. The embodiments are not limited in this context. Through shown as round particles, the conductive filler 104 may include particles of any appropriate shape including equiaxed shapes, elongated shapes, and irregular shapes. According to various embodiments, the volume fraction of the conductive filler 104 may be arranged at a sufficiently high level to impart relatively low electrical resistance or electrical resistivity between a first electrode 108 (such as metal foil) and a second electrode 110, opposite the first surface. Depending upon the composition of the conductive filler 104 and the shape of the particles of the conductive filler 104, the volume fraction of the conductive filler 104 may range from 5% to 80%.

The PPTC assembly 100 may further include a polymer filler 106, disposed in contact with the polymer matrix 102. In the example of FIG. 1A, the polymer filler 106 may be dispersed as particles within the polymer matrix 102. According to some embodiments, the polymer matrix 102 may have a positive coefficient of thermal expansion characterized by a first value. An exemplary range for the first value of a linear coefficient of thermal expansion may be between 10×10−6/K and 200×10−6/K. The embodiments are not limited in this context. As such, the polymer matrix 102 may tend to expand when heated, even while in a low temperature state. For example, unmodified, the polymer matrix 102 may expand by 1% in a linear direction over a 100 degree change in temperature, when the thermal expansion coefficient equals and 100×10−6/K. In some embodiments, the polymer filler 106 may exhibit a positive temperature coefficient of thermal expansion having a second value, less than the first value. Examples of a range of values for a positive temperature coefficient of thermal expansion for the polymer filler 106 include $1\times10^{-6}$/K to $10\times10^{-6}$/K. When incorporated in the polymer matrix 102 at a suitable volume fraction, the polymer filler 106 may tend to reduce or counteract the expansion of the polymer matrix 102 as temperature increases.

In other embodiments, the polymer filler 106 may be deemed a high temperature polymer, wherein the term "high temperature polymer" as used herein may refer to a semicrystalline of crystalline polymer filler having a melting temperature at least 20 degrees greater than the melting temperature of the polymer matrix 102. Thus, the term high temperature polymer need not refer to the absolute melting temperature of the polymer filler 106, but just to the relatively higher melting temperature compared to the melting temperature of the polymer matrix 102.

Figure 1B:
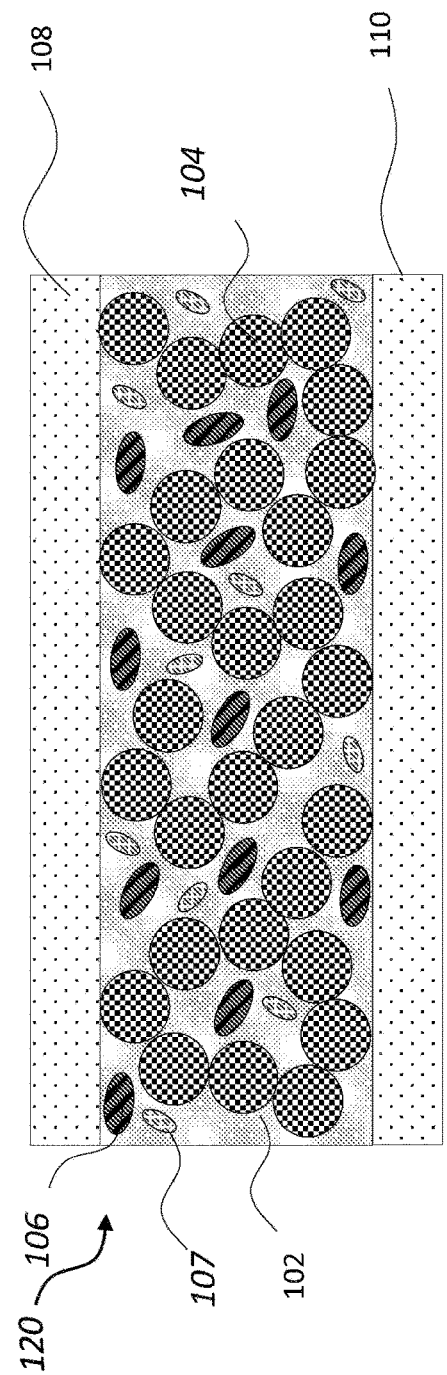
FIG. 1B depicts a side cross-sectional view of another PPTC device, according to embodiments of the disclosure.

In other embodiments, a PPTC assembly may be constructed as shown in FIG. 1B. FIG. 1B illustrates a side cross-sectional view of a PPTC device 120, where a polymer matrix 102 includes a conductive filler 104, dispersed therein. The polymer matrix 102 may be formed of any suitable polymer for forming a PPTC device, as in FIG. 1A. In addition, the PPTC device 120 may include a second polymer filler 107. According to some embodiments, the volume fraction of polymer filler, including the polymer filler 106 and polymer filler 107 may range up to 20%. In other embodiments, a third polymer, or a fourth polymer filler, a fifth polymer, sixth polymer, and so forth, may be added, where the total volume fraction ranges from 1% up to 20%. Said differently, the polymer matrix 102 may be filled with one polymer filler, two different polymer fillers, three different polymer fillers, four different polymer fillers, five different polymer fillers, six different polymer fillers, and so forth. Generally, the total volume fraction occupied by all the polymer fillers together may be 20% or less.

Figure 2B:
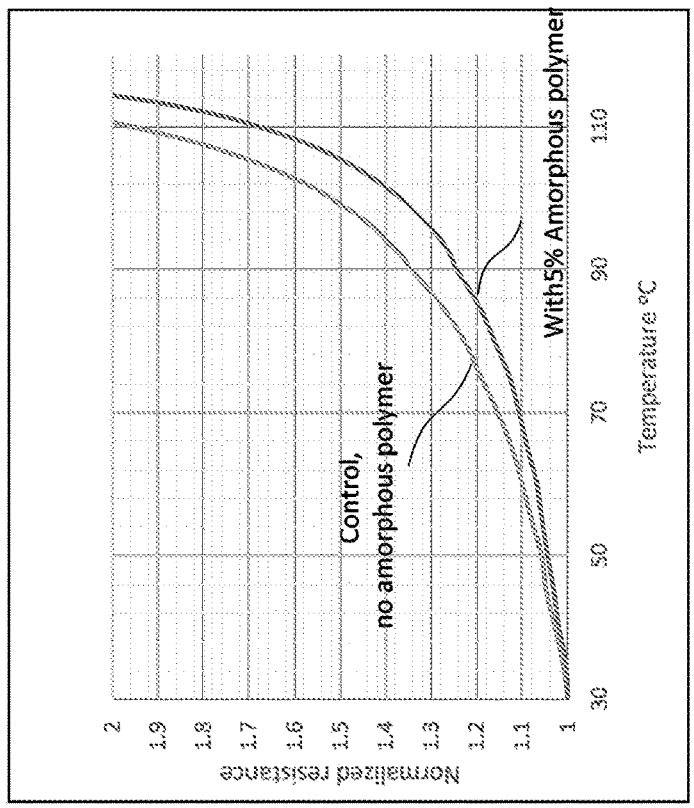
FIG. 2B depicts a portion of the graphs of FIG. 2A, with resistance normalized.
Figure 2A:
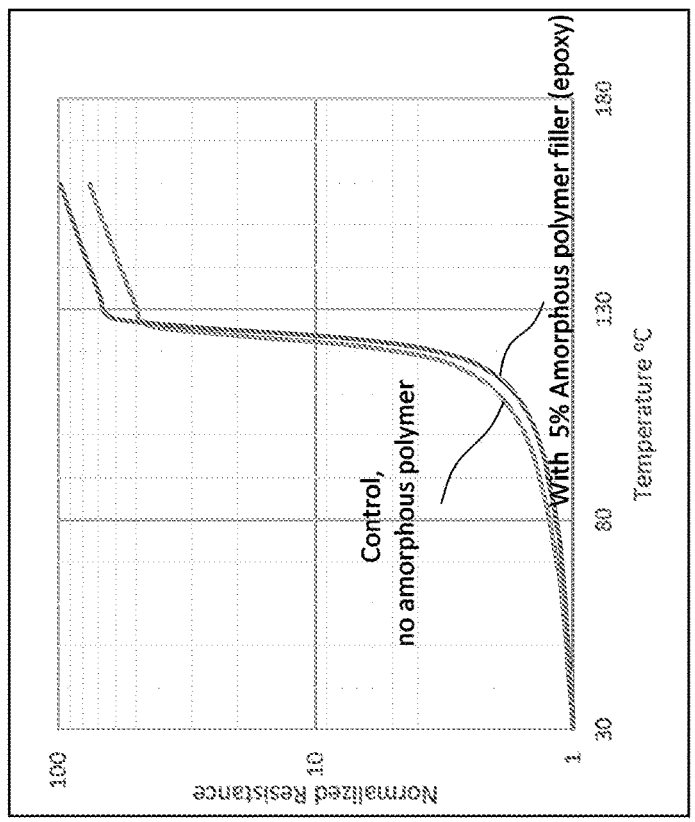
FIG. 2A depicts a graph showing electrical resistance as a function of temperature for a reference material and a PPTC material arranged according to embodiments of the disclosure.

In accordance with the various embodiments, the addition of a small fraction of low thermal expansion polymer or amorphous polymer to a polymer matrix in a PPTC material may generate a pronounced improvement in electrical properties. FIG. 2A depict graphs showing electrical resistance as a function of temperature for a reference material and a PPTC material arranged according to embodiments of the disclosure; the reference material has composition of 60% polyethylene and 40% carbon volume. As shown, the normalized resistance increases substantially above 110 C. The PPTC material of the present embodiments exhibits the same composition as the reference material, except with the addition of a polymer filler (epoxy), at 5% volume fraction (and a reduction to 55% polyethylene by volume). As shown, the normalized resistance remains lower up to 90 C degrees, and exhibits less resistance increase before the melting transition above 100 C. The resistance ratio of electrical resistance at 80 C compared to that at 30 C is 1.22 without the 5% polymer filler, and decreases to a value of 1.15, with the addition of 5% epoxy, as shown in Table I.

TABLE I

| Formulation by volume. | R80° C./R30° C. |
|---|---|
| 60% PE, 40% Carbon | 1.22 |
| 55% PE, 40% CB, 5% Epoxy | 1.15 |

Figure 3A:
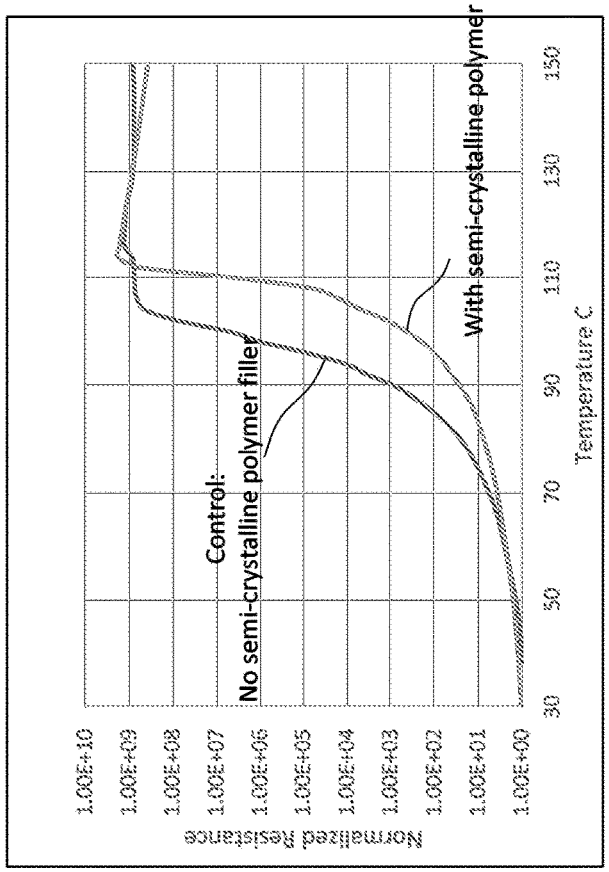
FIG. 3A depicts a graph showing electrical resistance as a function of temperature for a reference material and a PPTC material arranged according to embodiments of the disclosure.
Figure 3B:
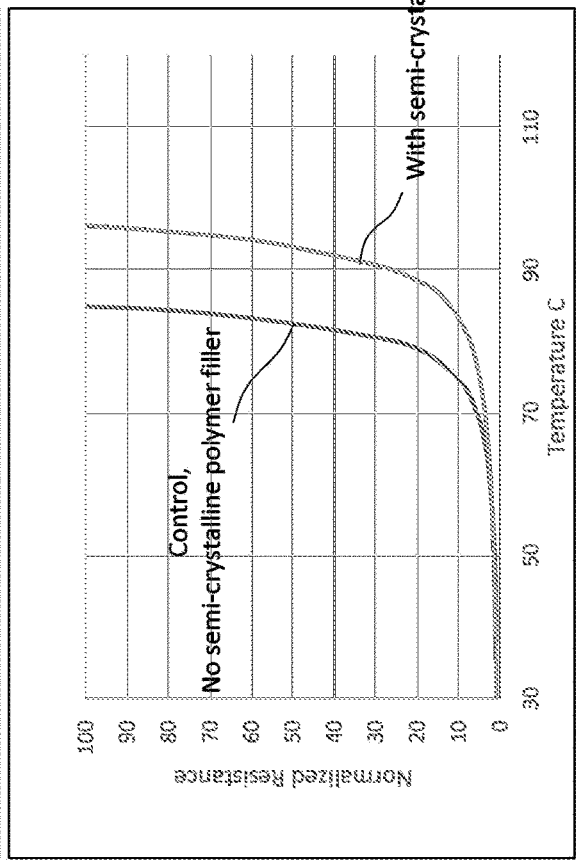
FIG. 3B depicts a portion of the graphs of FIG. 3A, with resistance normalized.

FIG. 3A depicts a graph showing electrical resistance as a function of temperature for a reference material and a PPTC material arranged according to embodiments of the disclosure while FIG. 3B depicts a portion of the graphs of FIG. 3A, with resistance normalized. In this example, the reference material is formed of 52% polyethylene (PE), with a conductive filler of 48% WC. The PPTC material according to the present embodiments is formed of 42% polyethylene with a conductive filler of 48% WC, and 10% Ethylene tetrafluoroethylene (ETFE) (a semicrystalline polymer). As shown, the resistance exhibits less increase between room temperature (20 C) and 80 C, as also indicated by the normalized resistance ratio between 80 C and 20 C, where the reference material exhibits a 25.6 fold increase, and the material of the present embodiments exhibits just an 8.3 fold increase.

Figure 4A:
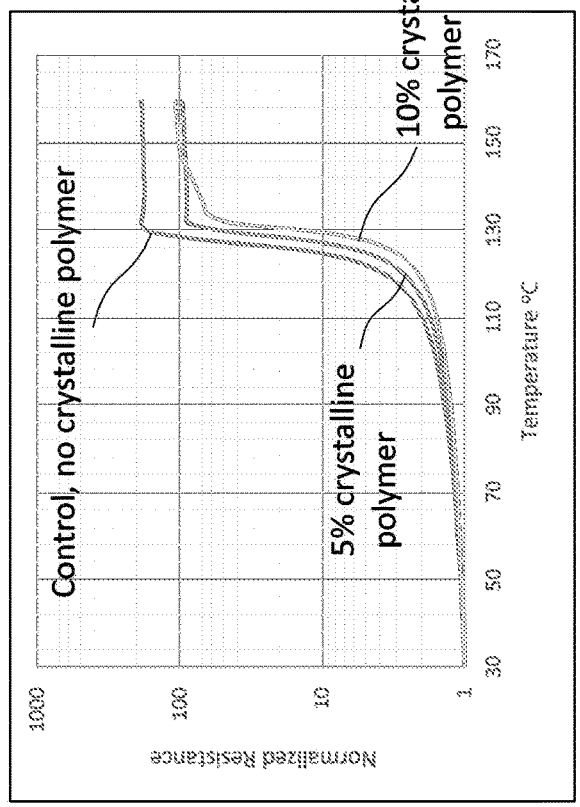
FIG. 4A depicts a graph showing electrical resistance as a function of temperature for a reference material and another set of PPTC materials arranged according to embodiments of the disclosure.
Figure 4B:
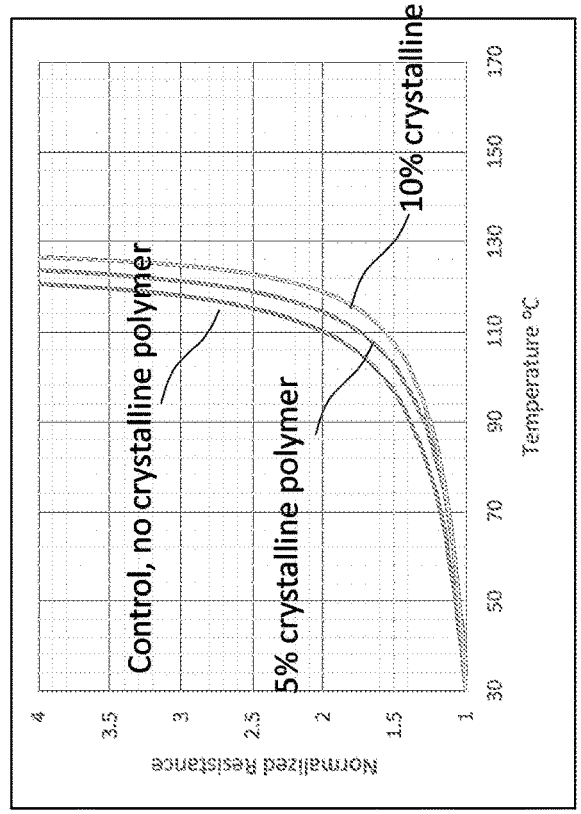
FIG. 4B depicts a portion of the graphs of FIG. 4A, with resistance normalized.

FIG. 4A depicts a graph showing electrical resistance as a function of temperature for a reference material and a set of PPTC materials arranged according to embodiments of the disclosure while FIG. 4B depicts a portion of the graphs of FIG. 4A, with resistance normalized. The reference material in this example is formed from 60% polyethylene as a polymer matrix, with 40% carbon black by volume, added as conductive filler. In one PPTC sample arranged according to the present embodiments, the overall composition is 55% polyethylene as a polymer matrix, with 40% carbon black by volume, and 5% polyvinylidene fluoride (PVDF) added as a high temperature polymer filler. The melting temperature of the PE polymer matrix is ~120 C, while the melting temperature of the PVDF polymer filler is 170 C, meaning the melting temperature of the PVDF polymer filler is approximately 50 C higher than the melting temperature of the PE polymer matrix.

In another PPTC sample arranged according to the present embodiments, the overall composition is 50% polyethylene as a polymer matrix, with 40% carbon black by volume, and 10% polyvinylidene fluoride (PVDF) added as a high temperature polymer filler. Table I. presents the results of relative resistance ratio measured between 80 C and 30 C for the samples of FIGS. 4A, 4B. As shown, the relative resistance ratio (or thermal derating) decreases with increasing addition of PVDF, while the largest effect takes place between 0% and 5%. Thus, the addition of PVDF in small amount improves the thermal derating with respect to use of pure PE.

TABLE II

| Formulation by volume. | R80° C./R30° C. |
|---|---|
| 60% PE, 40% Carbon, 0% PVDF | 1.26 |
| 55% PE, 40% Carbon, 5% PVDF | 1.19 |
| 50% PE, 40% Carbon, 10% PVDF | 1.17 |

The above examples where PVDF may be added to a PE matrix are merely exemplary. In further embodiments, other high temperature polymers may be used instead of or in addition to PVDF to improve thermal derating and/or process jump of a PPTC material. For example, known polyamide materials (sometimes referred to as nylon) may exhibit melting temperatures in the range of approximately 200 C to 350 C. Thus, such materials constitute a high temperature polymer with respect to a polyethylene polymer matrix, in that the melting temperature of the polyamide filler is on the order of 80 degrees C. to 200+ degrees C. higher than the melting temperature of PE.

Figure 5A:
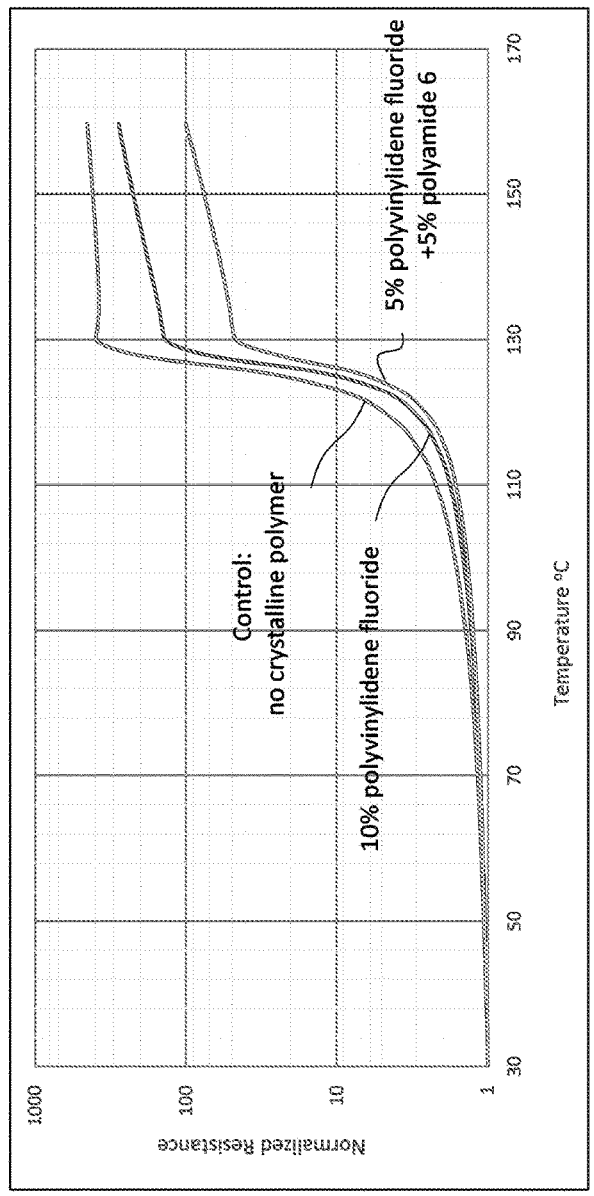
FIG. 5A depicts a graph showing electrical resistance as a function of temperature for a reference material and a further PPTC material arranged according to embodiments of the disclosure.
Figure 5B:
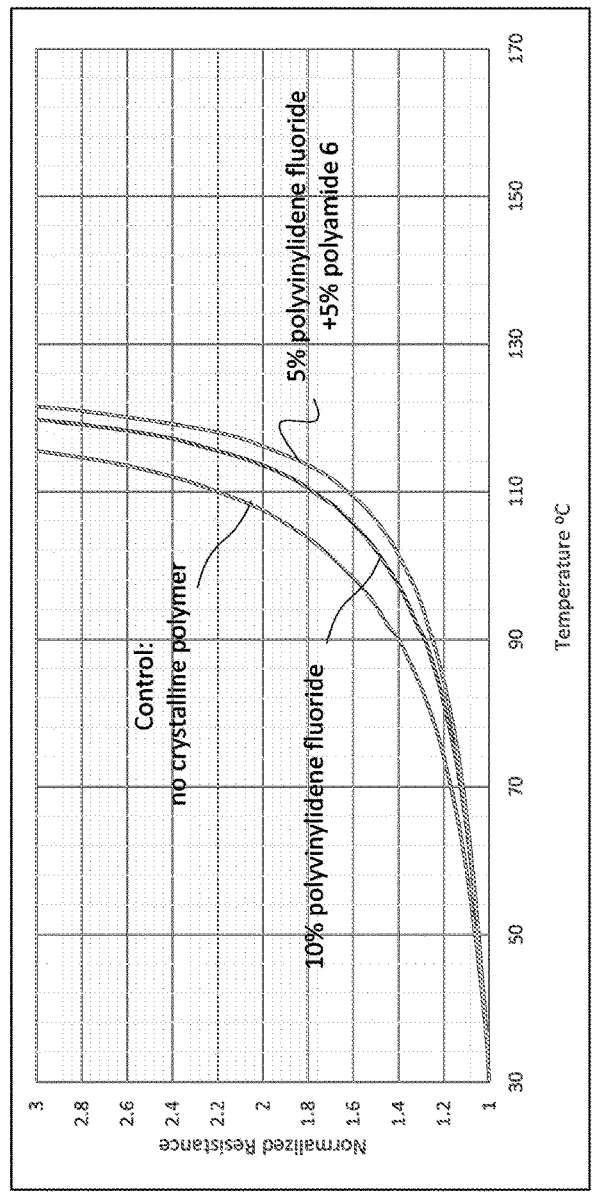
FIG. 5B depicts a portion of the graph of FIG. 5A, with resistance normalized.

FIG. 5A depicts a graph showing electrical resistance as a function of temperature for a reference material and a set of PPTC materials arranged according to embodiments of the disclosure while FIG. 5B depicts a portion of the graphs of FIG. 5A, with resistance normalized. The reference material includes 60% polyethylene (PE) and 40% carbon filler. One PPTC according to embodiments of the disclosure includes 50% PE and 10% PVDF as a polymer filler (balance 40% carbon), while another PPTC material according to additional embodiments includes 50% PE, 5% PVDF as a polymer filler and 5% nylon6 (polyamide) as a second polymer filler. The addition of 10% polymer filler, whether added as a single polymer, or as two polymers, results in a smaller resistance ratio ($R_{90\ C}/R_{30\ C}$).

In additional embodiments of the disclosure, by selective incorporation of a small amount of high temperature polymer as a polymer filler in a relatively lower temperature polymer matrix, the processing stability may be substantially increased, as reflected in reduced electrical resistance increase. A so-called "process jump" is an indication of stability of a PPTC material, as measured by electrical resistance changes after the PPTC material is subject to a given set of processing operations—the less the process jump, the better. Table III. depicts the results of the relative increase in resistance of PPTC materials after being subjected to thermal treatments composed of several operations at high temperatures. In particular, the PPTC samples are subjected to 2 reflows, and 2 treatments at 150 C for 30 minutes and 2 treatments at 150 C for 2 hr.

The PPTC samples in accordance with the present embodiments all are based upon a polyethylene matrix (45%-60%) with 40% carbon filler, with small amounts of PVDF and/or nylon filler (in particular, nylon6) added. Various combinations of nylon6 and PVDF are added in 5% increments, with a total volume fraction of polymer filler being 5%, 10%, or 15%, as shown. As shown, the addition of PVDF or nylon reduces process jump, while the addition of PVDF and nylon, unexpectedly has a dramatic effect on reducing process jump. For example, the addition of 5% PVDF and 5% nylon reduces process jump to just 1.095 (+9.5%), while the addition of 5% PVDF and 10% nylon yields a process jump of 0.942 (-6%), meaning an improvement in resistance. In addition, in comparison to a single polymer filler at 10% total volume fraction (samples 5,6) two polymer fillers added to equal total volume 10% (sample 4) generates less process jump.

TABLE III

| | Carbon Filler | Polyethylene | Polyvinylidene fluoride | Nylon6 | Process jump 2xReflow + 2x (150° C./30 min + 150° C./2 h) |
|---|---|---|---|---|---|
| 1 | 40% | 60% | 0% | 0% | 1.534 |
| 2 | 40% | 55% | 5% | 0% | 1.131 |
| 3 | 40% | 55% | 0% | 5% | 1.131 |
| 4 | 40% | 50% | 5% | 5% | 1.095 |
| 5 | 40% | 50% | 10% | 0% | 1.273 |
| 6 | 40% | 50% | 0% | 10% | 1.134 |

TABLE III-continued

| | Carbon Filler | Polyethylene | Polyvinylidene fluoride | Nylon6 | Process jump 2xReflow + 2x (150° C./30 min + 150° C./2 h) |
|---|---|---|---|---|---|
| 7 | 40% | 45% | 5% | 10% | 0.942 |
| 8 | 40% | 45% | 10% | 5% | 1.066 |

Figure 6:
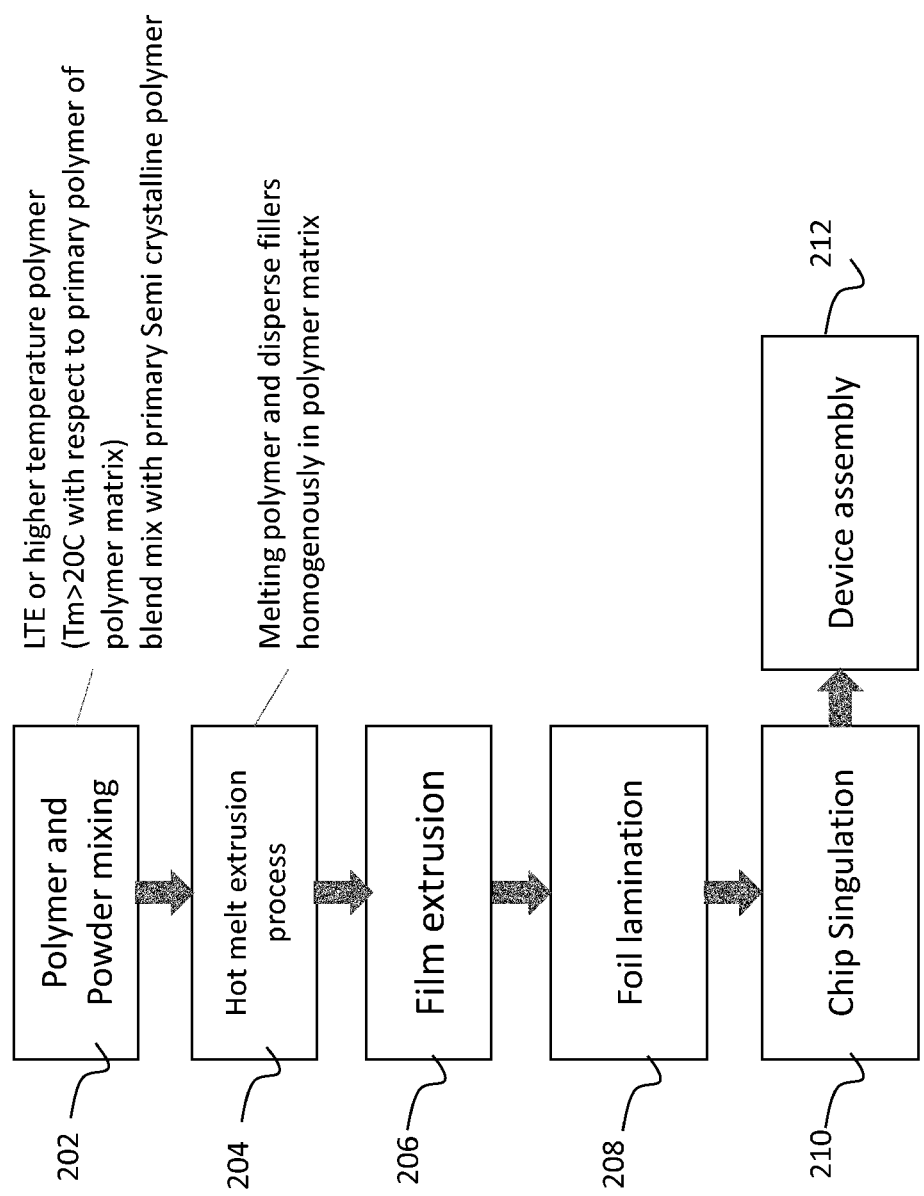
FIG. 6 depicts a process flow according to other embodiments of the disclosure.

Without limitation as to a particular theory, the lowered resistance jump provided by the PPTC material of the present embodiments may be understood by consideration of the effect of the various thermal processing operations. During these operations, multiple polymer melting and recrystallization events may take place, for example, for a polymer material having a largest fraction of polyethylene as the matrix material. The original conductive network of the untreated PPTC material may therefore be changed by all these melting and recrystallization operations, leading to a resistance increase. When melt mixing is performed to add a small fraction of high temperature polymer particles to the relatively lower temperature polymer matrix (such as a polyethylene matrix), the dispersed high temperature polymer particles may act as nucleation sites. These nucleation sites may provide a reversible size of a polymer crystal during recrystallization, to minimize the change in the conductive network, and may reduce the thermal expansion of the polymer matrix material FIG. 6 depicts a process flow 200, according to embodiments of the disclosure. At block 202, a polymer matrix made from first polymer material is mixed with a small amount of powder, in the form of a different polymer. In some embodiments, the volume fraction of powder is approximately 15% or less, such as 10%, 5%, or 2%. The embodiments are not limited in this context. In certain embodiments, the polymer of the powder additive is a low thermal expansion (LTE) polymer, having a coefficient of thermal expansion of less than 10×10−6/K. In some embodiments, the LTE polymer may be an amorphous polymer. In other embodiments the polymer of the powder additive is a high temperature polymer, meaning the melting temperature of the polymer powder additive is at least 20 C greater than the melting temperature of the polymer matrix.

At block 204 a hot melt extrusion process is performed, where the polymer filler is homogeneously dispersed within the polymer matrix. At block 206, a film extrusion is performed, where the polymer matrix and polymer filler mixture is extruded in a film form to form a PPTC film.

At block 208, a foil lamination process is performed to produce electrodes on opposite surfaces of the PPTC film. At block 210, chip singulation is performed to form a single PPTC device, while at block 212 the PPTC device is assembled.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A polymer positive temperature coefficient (PPTC) material, comprising:
a polymer matrix, the polymer matrix comprising a first polymer;
a conductive filler, disposed in the polymer matrix;
and at least one polymer filler, dispersed within the polymer matrix, the at least one polymer filler comprising a second polymer, different from the first polymer, wherein the first polymer comprises a first melting temperature, and wherein the second polymer comprises a second melting temperature, the second melting temperature exceeding the first melting temperature by at least 20 C;
wherein the first polymer comprises epoxy, and wherein the second polymer comprises epoxy.

2. The PPTC material of claim 1, wherein the polymer matrix comprises polyethylene (PE) and wherein the at least one polymer filler comprises polyvinylidene fluoride (PVDF).

3. The PPTC material of claim 2, wherein the conductive filler comprises carbon or a metal, having a volume fraction of 10% to 60%.

4. The PPTC material of claim 2, wherein a volume fraction of the at least one polymer filler is between 1% and 20%.

5. The PPTC material of claim 1, wherein the polymer matrix comprises low density polyethylene and the at least one polymer filler comprises polyethylene tetrafluoroethylene (ETFE).

6. The PPTC material of claim 5, wherein a volume fraction of the at least one polymer filler is between 1% and 15%.

7. The PPTC material of claim 5, wherein the conductive filler comprises tungsten carbide, having a volume fraction of 40% to 60%.

8. The PPTC material of claim 1, wherein the at least one polymer filler comprises a first polymer filler and a second polymer filler, the second polymer filler comprising a third polymer, different from the first polymer and the second polymer.

9. The PPTC material of claim 8, wherein the first polymer filler and the second polymer filler together comprise a volume fraction of 1% to 20%.

10. The PPTC material of claim 8, the first polymer filler comprising PVDF and the second polymer filler comprising nylon6.

11. The PPTC material of claim 10, wherein the first polymer filler comprises a volume fraction of at least 5% and wherein the second polymer filler comprises a volume fraction of at least 5%.

12. A polymer positive temperature coefficient (PPTC) material, comprising:
a polymer matrix, the polymer matrix comprising a first polymer;
a conductive filler, disposed in the polymer matrix;
and at least one polymer filler, dispersed within the polymer matrix, the at least one polymer filler comprising a second polymer, different from the first polymer, wherein the first polymer comprises a first melting temperature, and wherein the second polymer comprises an amorphous materials;
wherein the first polymer comprises epoxy, and wherein the second polymer comprises epoxy.

13. The PPTC material of claim 12, wherein the conductive filler comprises a volume fraction of between 40% and 60%.

14. The PPTC material of claim 12, wherein the second polymer comprises a volume fraction of 1% to 20%.

15. A method of forming a PPTC assembly, comprising:
providing a polymer matrix, the polymer matrix comprising a first polymer;

mixing a first powder, comprising a second polymer, and a second powder, comprising a conductive filler, in the polymer matrix, to form a PPTC material;

performing hot melt extrusion process on the PPTC material;

extruding the PPTC material to form a PPTC film;

performing a foil lamination process on the PPTC film to form a device sheet; and singulating the device sheet to form a PPTC device;

wherein the first polymer comprises epoxy, and wherein the second polymer comprises epoxy.

16. The method of claim 15, wherein the first polymer comprises a first melting temperature, and wherein the second polymer comprises a second melting temperature, the second melting temperature exceeding the first melting temperature by at least 20 C.

17. The method of claim 15, wherein the first polymer comprises a crystalline of semicrystalline polymer, and wherein the second polymer comprises an amorphous polymer.

18. The method of claim 15, wherein the first polymer comprises a volume fraction of at least 35%, and wherein the second polymer comprises a volume fraction of 1% to 20%.

19. The method of claim 18, further comprising mixing a third powder, comprising a third polymer, with the first powder and the second powder, wherein the second polymer and the third polymer together comprise a volume fraction of 1% to 20%.

* * * * *